United States Patent [19]

Tiefenthaler

[11] Patent Number: 4,977,925
[45] Date of Patent: Dec. 18, 1990

[54] SAFETY VALVE

[75] Inventor: Edelbert Tiefenthaler, Elgg, Switzerland

[73] Assignee: Sulzer Brothers Limited, Winterthur, Switzerland

[21] Appl. No.: 416,877

[22] Filed: Oct. 4, 1989

[30] Foreign Application Priority Data

Oct. 13, 1988 [CH] Switzerland .......... 3822/88

[51] Int. Cl.$^5$ .......................................... G05D 16/10
[52] U.S. Cl. ............................ 137/489.5; 137/492.5
[58] Field of Search .................. 137/489.5, 492, 482.5; 251/28

[56] References Cited

U.S. PATENT DOCUMENTS

| | | | |
|---|---|---|---|
| 833,062 | 10/1906 | Kirchbaum | 251/28 X |
| 1,110,320 | 9/1914 | Fulton | 251/28 X |
| 2,304,323 | 12/1942 | Wiegers | 251/28 |
| 2,573,231 | 10/1951 | Teague | |
| 2,587,212 | 2/1952 | Placentee | |
| 3,589,390 | 6/1971 | Frantz | 137/489.5 |
| 4,398,393 | 8/1983 | Ipsen | 251/28 X |

FOREIGN PATENT DOCUMENTS

| | | |
|---|---|---|
| 0110210 | 6/1984 | European Pat. Off. |
| 0116247 | 8/1984 | European Pat. Off. |
| 2202959 | 8/1973 | Fed. Rep. of Germany |
| 1577361 | 8/1969 | France |

Primary Examiner—Alan Cohan
Attorney, Agent, or Firm—Kenyon & Kenyon

[57] ABSTRACT

The safety valve has a main lid and a servopiston movable in a servopiston chamber. A pilot valve has a lid loaded by a predetermined force in its closing direction and opens in response to a pressure corresponding to such force. Associated with the pilot valve is a piston whose two end faces extend one each into a piston chamber. One piston chamber is directly connected to the chamber to be protected by the safety valve against excess pressure whereas the other chamber is connected to the inflow side of the pilot valve and by way of a restriction to the protected chamber. A duct communicates the chamber of the pilot valve with the servopiston side remote from the main lid that when the pilot lid opens the main lid is opened by the loading of the servopiston.

8 Claims, 2 Drawing Sheets

SAFETY VALVE

The invention relates to a safety valve and particularly to means for controlling a safety valve.

Heretofore, various types of safety valves have been known for relieving pressure in pipe lines, pressure chambers, and the like. In many cases, the safety valves have been constructed with a separate means for controlling the operation of the safety valve. For example, European Patent No. 0 110 210 describes an arrangement in which a safety valve has a main lid which is movable by means of a servopiston which, in turn, is movable in a servopiston chamber. The means for controlling the safety valve is constituted by a pilot valve having a lid which experiences a predetermined force in a closing direction and which opens in response to a pressure on the lid which corresponds to this force. In addition, a piston is associated with the pilot valve with the end faces of the piston disposed in a respective piston chamber. Further, one chamber is directly connected to the chamber to be protected by the safety valve against excess pressure whereas the other chamber is connected to an inflow side of the pilot valve and by way of a restriction to the protected chamber. Suitable means are also provided to produce an operative action of the piston on the pilot lid, the cross-sectional area of the piston being greater than the lid area experiencing the pressure in the other piston chamber.

The main lid is so disposed in a valve body that the servopiston is permanently pressurized in the closed safety position and, upon the safety pressure being exceeded, is relieved of load by the pilot lid opening. Thus, the safety valve opens. In this arrangement, the servopiston chamber which experiences permanent pressurization in the safety position may fill to some extent with condensate evolved from vapor from the chamber to be protected. However, as the condensate evaporates when the pilot valve opens, the vapor impedes a rapid opening of the safety valve.

Accordingly, it is an object of the invention to improve the control of a safety valve so that the opening movement of the safety valve cannot be impeded as a result of the formation of vapor.

It is another object of the invention to improve the control of existing safety valve.

It is another object of the invention avoid the collection of condensate in a servopiston chamber of a safety valve.

Briefly, the invention provides an arrangement containing a safety valve having an inflow chamber for connection with a chamber to be protected against excessive pressure, a pilot valve for controlling the operation of the safety valve and a piston for controlling the operation of the pilot valve to protect against condensate collecting in the chambers of the safety valve.

The safety valve is provided with an outlet chamber, a main lid and a servopiston connected to the lid for moving the lid between a closed position closing the inflow and outlet chambers relative to each other and an open position communicating these chambers with each other. In addition, a servopiston chamber is provided on a side of the servopiston remote from the main lid.

The pilot valve has a third chamber which communicates via a line with the servopiston chamber as well as a valve seat which opens into this third chamber. In addition, a pilot valve lid is biased against the valve seat in order to close the chamber.

The piston has a means for moving the pilot valve lid from the valve seat and also has a cross-sectional area greater than the area of the pilot valve lid which is exposed to the valve seat thereof. A pair of chambers are disposed on opposite sides of the piston so that one chamber receives one end of the piston and communicates with the valve seat of the pilot valve as well as with the chamber to be protected via a line with a restriction therein while the other chamber receives a second end of the piston and also communicates with the chamber to be protected against excessive pressure.

Due to the communication between the chamber of the pilot valve and the servopiston chamber on the side remote from the main lid, upon opening of the pilot valve lid, the main lid is moved into the open position by the loading of the servopiston.

Consequently, the servopiston chambers are permanently depressurized when in the closed safety position and so condensate cannot form and collect in such chambers. Vapor flows into the corresponding servopiston chamber and loads the servopiston only when the pilot valve opens in response to an overshoot of the safety pressure, so that the main lid moves in the sense of an opening without hindrance. Condensate cannot therefore collect in the servopiston chamber before the opening of the safety valve.

These and other objects and advantages of the invention will become more apparent from the following detailed description taken in conjunction with the accompanying drawings wherein.

Figure 1:
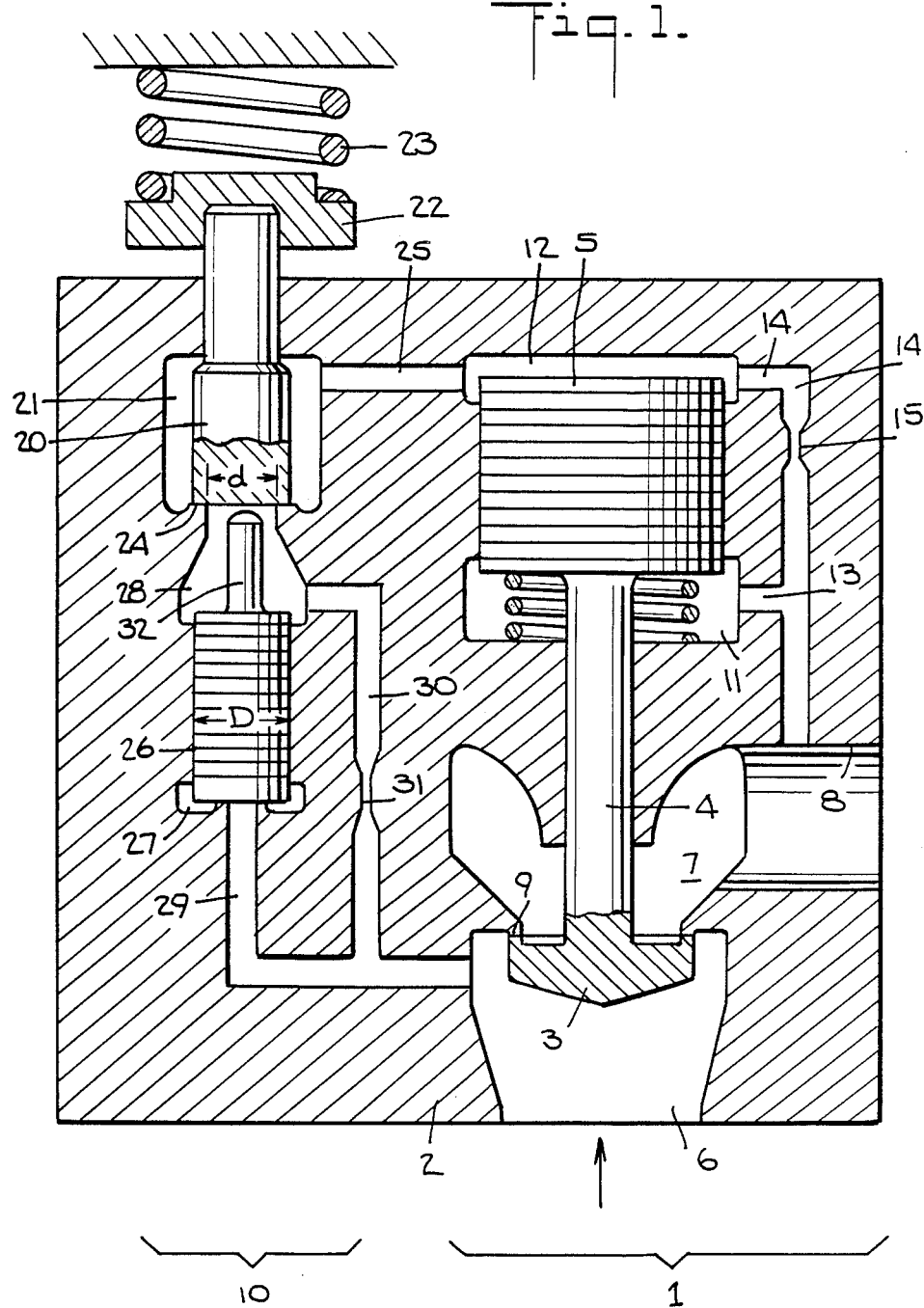
FIG. 1 illustrates a diagramatic view in cross-section of a safety valve and control means constructed in accordance with the invention.

Referring to FIG. 1, the overall valve arrangement has a safety valve 1 mainly comprised of a valve body 2, a movable main lid 3 and a servopiston 5 which is rigidly connected to the lid 3 by a rod 4. The valve body 2 includes an inflow chamber 6 to which a vapor line (not shown) requiring protection against excess pressure is connected. The valve body 2 also has an outlet chamber 7 which merges into a lateral bore 8 to which an outlet or discharge line can be connected. A valve seat surface 9 is provided in the body 2 between the chambers 6, 7 and cooperates with a matching sealing surface of the main lid 3.

Servochambers 11, 12 are disposed one on either side of the servopiston 5 in the body 2 and are connected by way of a respective duct 13, 14 to the bore 8. A restrictor 15 is present in the duct 14 above the junction with the duct 13. A spring 16 is disposed in the chamber 11 so that when the safety valve 1 is pressureless, the spring 16 presses the servopiston into the top position illustrated in which the main lid 3 is in sealing engagement with the seat surface 9, i.e., a closed position.

The servopiston 5 thus serves to move the main lid 3 between a closed position, as shown, closing the inflow chamber 6 from the outlet chamber 7 and an open position communicating the chambers 6, 7 with each other.

A pilot valve 10 is disposed in the body 2 and includes a pilot valve lid 20 disposed within a chamber 21 and which projects from the valve body 2. As indicated, the pilot valve lid 20 is seated against a valve seat 24 so as to close off the chamber 21. In addition, a cup washer 22 rests on the upper end of the lid 20 and is associated with a spring 23 which biases the pilot lid 20 onto the valve seat 24. A line or duct 25 communicates the chamber 21 with the servopiston chamber 12 remote from the main lid 3 for purposes as explained below.

A piston 26 is also associated with the pilot valve 10. This piston 26 has one end received in a chamber 27 which, in turn, communicates via a line or duct 29 with the inflow chamber 6. On the opposite end, the piston 26 is received in another chamber 28 which communicates with the valve seat 24 of the pilot valve and, via a line 30 having a restrictor 31 with the line 29 leading to the inflow chamber 6. In addition, the piston 26 which is mounted independently from the pilot valve lid 20 has a means in the form of a rod-like extension 32 for moving the pilot valve lid 20 from the valve seat 24. As indicated, the cross-sectional area of the piston 26 is greater than the area of the pilot valve lid 20 exposed to the valve seat 24. In this respect, the diameter D of the piston 26 is greater than the inner diameter d of the valve seat 24.

The control means operate as follows: when the plant of which the safety valve 1 forms a part is operating normally, the main lid 3 is in a closed position and pressurized vapor is present in the inflow chamber 6. Vapor at the same pressure is also present in the ducts 29, 30 and in the respective associated piston chambers 27, 28. Since the pilot lid 20 is also in a closed position, the chambers 21, 11, 12, 7 are either at a much lower pressure than the vapor in the inflow chamber 6 or are pressureless.

When the pressure in the inflow chamber 6 increases to the critical value, the pilot lid 20 rises so that vapor flows from the chamber 28 to the chamber 21 and therefrom through duct 25 to the servopiston chamber 12. Because of the opening movement of the pilot lid 20, the pressure in the chamber 28 drops, something which in the absence of the piston 26 would lead to a rapid closure of the pilot valve 10. However, since the full vapor pressure is effective in the chamber 27 and since the pressure in the chamber 28 has dropped, the piston 26 experiences a pressure difference which also moves the piston 26 upwards, as viewed, so that the projection 32 engages the pilot lid 20 and opens the lid 20 further and keeps the lid 20 open. The resulting continuing supply of vapor to the servopiston chamber 12 produces a pressure therein which acts on the servopiston 5 and forces the lid 3 downwards, as viewed. The lid 3 therefore opens the safety valve 1 and vapor flows through the chamber 7 and bore 8. When the vapor pressure in the chamber 6 falls below the closing pressure of the pilot valve 10, the spring 23 returns the pilot lid 20 to the closed position shown and the piston 26 returns to its initial position. The pressure in the servopiston chamber 12 decreases by way of the duct 14 and restrictor 15 and because of the pressure difference acting on the lid 3, the servopiston 5 rises until returning to the closed position.

The presence of the piston 26 therefore obviates continuous opening and closing of the pilot valve 10—i.e., the piston 26 obviates valve flutter.

Figure 2:
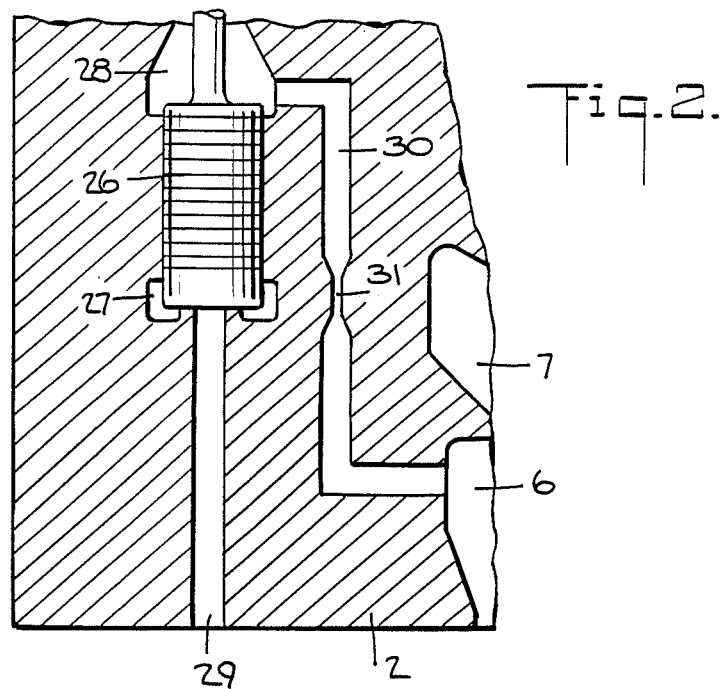
FIG. 2 illustrates a modified arrangement of the piston of the control means in accordance with the invention.

Referring to FIG. 2, wherein like reference characters indicate like parts as above, the duct 29' extends from the piston chamber 27 to the end of the body 2 and is connected by way of a line (not shown) to a pressure reservoir (not shown) in which the chamber to be protected against excess pressure is disposed. This chamber to be protected is also connected in a manner (not shown) to the inflow chamber 6 of the safety valve. As indicated, the duct 30 in which the restrictor 31 is disposed communicates directly with the inflow chamber 6.

Figure 3:
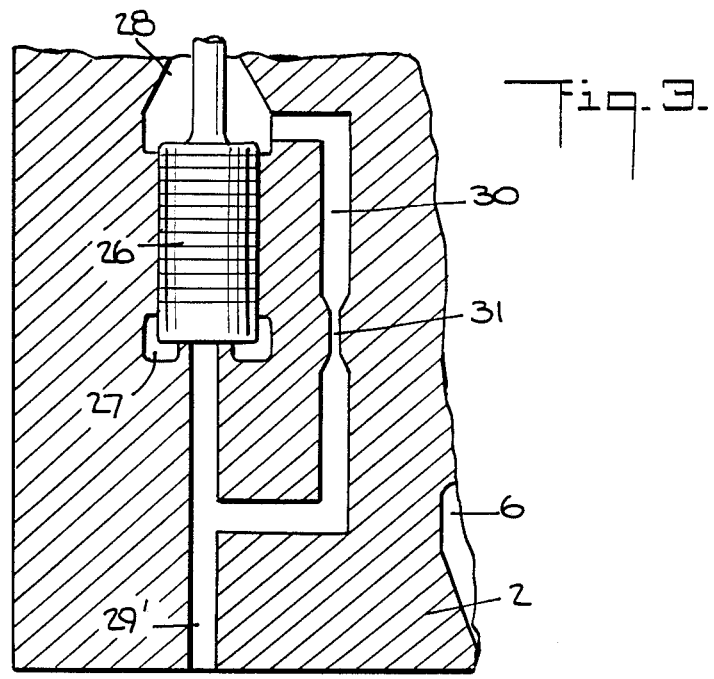
FIG. 3 illustrates a further modified arrangement for the piston in accordance with the invention.

Referring to FIG. 3, wherein like reference characters indicate like parts as above, the duct 30 from the piston chamber 28 may communicate directly with the duct 29'.

The invention thus provides a control means for the operation of a safety valve in which condensate is precluded from entering into the servopiston chambers before opening of a safety valve.

What is claimed is:

1. In combination,
   a safety valve having a flow chamber for connection with a chamber to be protected against excessive pressure, an outlet chamber, a main lid, a survopiston connected to said lid for moving said lid between a closed position closing said chambers relative to each other and an open position communicating said chambers with each other, and a servopiston chamber on a side of said servopiston remote from said main lid;
   a pilot valve having a third chamber, a valve seat opening into said third chamber and a pilot valve lid biased against said valve seat to close said third chamber;
   a movably mounted piston mounted independently from said pilot valve lid having means for moving said pilot valve lid from said valve seat, said piston having a cross-sectional area greater than the area of said pilot valve lid exposed to said valve seat;
   a fourth chamber receiving one end of said piston and communicating with said valve seat of said pilot valve;
   a line having a restriction therein and communicating said fourth chamber with the chamber to be protected;
   a fifth chamber receiving a second end of said piston and communicating with the chamber to be protected; and
   a line communicating said third chamber with said servopiston chamber whereby upon opening of said pilot valve lid from said valve seat, said fourth chamber communicates with said third chamber and said main lid is moved into said open position thereof.

2. The combination as set forth in claim 1 wherein said fifth chamber and said line communicate with said inflow chamber.

3. The combination as set forth in claim 1 which further comprises a spring biasing said servopiston in a direction to move said main lid into said closed position.

4. In combination,
   a safety valve having an inflow chamber for connection with a chamber to be protected against excessive pressure, an outlet chamber, a main lid, a servopiston connected to said lid for moving said lid between a closed position closing said chambers relative to each other and an open position communicating said chambers with each other and a servopiston chamber on a side of said servopiston remote from said lid;
   a pilot valve having a third chamber in communication with said servopiston chamber, a valve seat opening into said third chamber and a pilot valve lid biased against said valve seat to close said third chamber;

an independently mounted piston having means for moving said pilot valve lid from said valve seat;

a fourth chamber receiving one end of said piston and communicating with said valve seat;

a first line extending from said fourth chamber for connection with a source of pressure medium;

a fifth chamber receiving a second end of said piston; and a second line extending from said fifth chamber for connection with a source of pressure medium.

5. The combination as set forth in claim 4 wherein said first line is connected to said inflow chamber.

6. The combination as set forth in claim 5 wherein said second line is connected to said inflow chamber.

7. The combination as set forth in claim 4 wherein said first line is connected to said second line.

8. The combination as set forth in claim 4 wherein said first time having a restriction therein.

* * * * *

UNITED STATES PATENT AND TRADEMARK OFFICE
CERTIFICATE OF CORRECTION

PATENT NO. : 4,977,925
DATED : December 18, 1990
INVENTOR(S) : Edelbert Tiefenthaler It is certified that error appears in the above-identified patent and that said Letters Patent is hereby corrected as shown below:

Column 6, line 10 change "time" to -line-

Signed and Sealed this

First Day of September, 1992

Attest:

DOUGLAS B. COMER

Attesting Officer

Acting Commissioner of Patents and Trademarks